United States Patent [19]

Beane

[11] 4,180,464
[45] Dec. 25, 1979

[54] METHOD OF COVERING CORRUGATED DRAINAGE TUBES

[76] Inventor: Frank T. Beane, Rte. 4, Highway 49, Concord, N.C. 28025

[21] Appl. No.: 764,162

[22] Filed: Jan. 31, 1977

Related U.S. Application Data

[60] Continuation of Ser. No. 626,630, Oct. 29, 1975, abandoned, which is a division of Ser. No. 483,391, Jun. 25, 1974, Pat. No. 3,976,578.

[51] Int. Cl.² .............................................. B01D 29/14
[52] U.S. Cl. ................................................. 210/497 R
[58] Field of Search .................... 210/484, 497 R, 499; 61/11, 13

[56] References Cited

U.S. PATENT DOCUMENTS

| | | | |
|---|---|---|---|
| 1,137,480 | 4/1915 | Gwynn | 210/497 X |
| 2,394,895 | 2/1946 | Burhans | 210/484 X |
| 2,724,176 | 11/1955 | White | 210/484 X |
| 2,781,619 | 2/1957 | Gardes | 210/484 X |
| 3,356,227 | 12/1967 | Rule et al. | 210/484 |
| 3,685,657 | 8/1972 | Hunter et al. | 210/497 X |
| 3,830,373 | 8/1974 | Sixt et al. | 210/497 X |

*Primary Examiner*—William A. Cuchlinski, Jr.
*Attorney, Agent, or Firm*—Clifton T. Hunt

[57] ABSTRACT

A method of covering a corrugated drainage tube of the type having alternating peaks and valleys and a plurality of openings in selected valleys arranged along the longitudinal axis of the tube, said method comprising the steps of knitting a length of tubular knit fabric of less diameter than a maximum diameter of the corrugated tube, drawing the tubular knit fabric onto the tube under tension, and relaxing the tubular knit fabric to conform to the surface configuration of the corrugated tube.

2 Claims, 2 Drawing Figures

METHOD OF COVERING CORRUGATED DRAINAGE TUBES

RELATED APPLICATIONS

This application is a continuation of application Ser. No. 626,630, filed Oct. 29, 1975 now abandoned and entitled METHOD OF COVERING CORRUGATED DRAINAGE TUBES, which was a division of application Ser. No. 483,391, filed June 25, 1974, now U.S. Pat. No. 3,976,578 and entitled PROTECTIVE SLEEVE FOR CORRUGATED DRAINAGE TUBES.

BACKGROUND OF THE INVENTION

In recent years, the drainage pipe industry has developed new types of flexible corrugated drainage and irrigation tubing wherein the wall thereof includes alternating annular peaks and valleys and a plurality of peripheral slotted openings arranged transversely to the longitudinal axis of the tube. The Sixt U.S. Pat. No. 3,699,684 discloses that such drainage tubes can be coiled on a drum such as its shipping container and simply fed down into a trench immediately after it is dug. A sheet of flexible water-repellent material may be placed over the area of the tube in which the slotted openings are located. Alternatively a sheet of fine filtering material may be used instead of the water-repellent material.

Such a combination is not entirely satisfactory since the tube must be put in place and then the sheet of water-repellent material or filter material positioned in its proper place. Alternatively, it might be possible to permanently or semi-permanently attach the water-repellent material or filter material to the tube; however, these tubes must be transported, stacked, and dragged across fields. In doing so, such a type of filtering material would become dislodged or removed.

Also, U.S. Pat. Nos. 2,763,991 and 2,050,020 show systems similar to that of the aforementioned Sixt Patent, however, are objectionable for one reason or another.

SUMMARY OF THE INVENTION

The present invention, on the other hand, provides an improved sleeve which completely encircles the flexible drainage pipe with a cylindrical or tubular length of relatively elastic, knit fabric material. The sleeve is of a diameter, in the relaxed condition, less than the diameter of the drainage tube. Further, the knit fabric is preferably of non-run construction to prevent running if a snag occurs. The sleeve may be assembled on the pipe anywhere, even in the factory and once emplaced, will not become dislodged, removed or torn away.

In general, due to the inherent elasticity of the knit fabric, the tubular sleeve of the present invention provides a corrugated flexible drain pipe with a protective covering which is easily assembled on the pipe. Moreover, during transportation and movement of the pipe in the field, the sleeve will remain snugly in place, generally conforming to the configuration of the pipe, thereby preventing damage to the sleeve.

It is therefore an object of the present invention to improve the function of corrugated drain pipe by providing, in combination therewith, an improved, tubular, knit sleeve.

It is a further object of the present invention to provide a new and unique method of covering a corrugated drain pipe with a tubular knit sleeve that is easier to install, remains in place, and provides more protection than those known heretofore.

BRIEF DESCRIPTION OF THE DRAWINGS

Other objects and fuller understanding of the invention will become apparent upon reading the following specification in view of the drawings wherein.

DETAILED DESCRIPTION OF THE INVENTION

Figure 1:
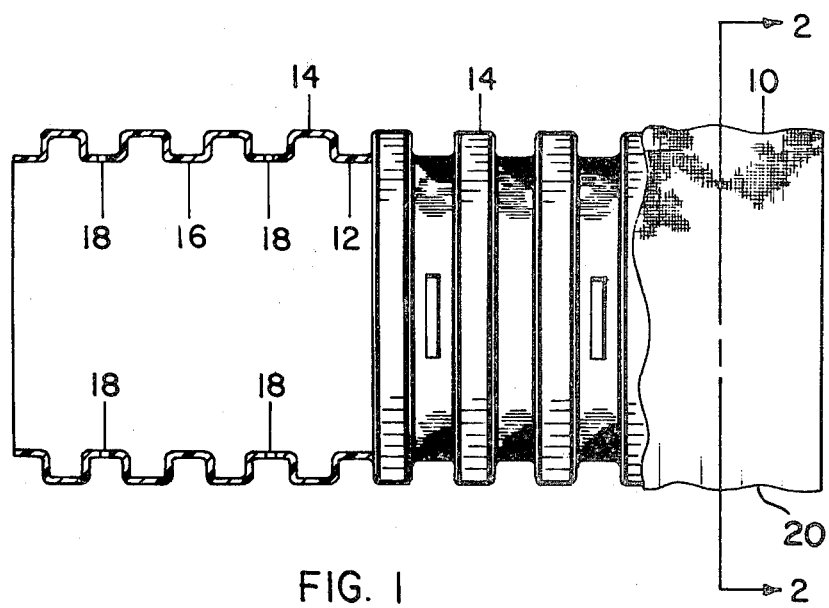
FIG. 1 is an elevation view, partly in section, with portions broken away illustrating a length of drain pipe with the sleeve mounted thereon in accordance with the present invention.
Figure 2:
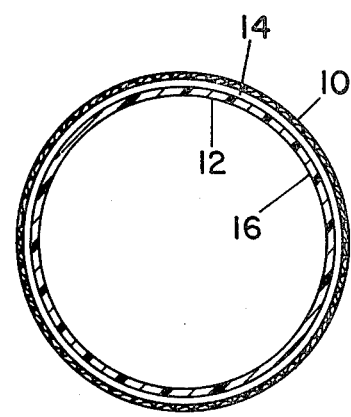
FIG. 2 is a sectional view taken substantially along lines 2—2 in FIG. 1.

Turning now to the drawings, the invention here involved is generally directed to an improved method of covering a corrugated, flexible drainage pipe 12 of the type having alternating annular peaks 14 and valleys 16 and a plurality of slotted openings 18 arranged at spaced points and extending arcuately around portions of the wall in directions transverse to the longitudinal axis of the pipe 12. A sleeve 10 comprises a continuous length of relatively elastic knit fabric which is tubular in shape and, in the relaxed condition, of a diameter less than the diameter of the corrugated drainage pipe 12, whereby when placed on pipe 12 the fabric is stretched to fit snugly therearound. The snug, stretched inherently elastic tubular sleeve is both easier to install and resists damage or dislodgement.

The sleeve 10 itself is formed of any suitable strand material on a circular knitting machine and is knit to form a continuous cylindrical tube in lengths of up to 1,000 feet, lengths of 250 to 300 feet being preferred for practicality as being substantially coextensive with the lengths of corrugated flexible drainage pipe. A conventional non-run stitch formation is used in the knitting operation, so that if a portion of the tube becomes torn during transportation or dragging along the ground the fabric will not run. By using a continuous tubular construction, it is not necessary to provide seams which would make sizing and installation difficult, or to wrap the fabric around the tube which would not be satisfactory because of the dislodgement problem when dragging the pipe sections along the ground.

The diameter of the tubular fabric is so designed that in the relaxed condition the sleeve diameter is less than the maximum diameter of the tube for which the fabric is to be used. This provides a snug fit and prevents longitudinal displacement of the fabric once it is in place as well as twisting or wrapping around the tube. When installed, the tubular knit fabric 10 relaxes into snug tight engagement with the peaks 14 of tube 12 and undulates inwardly toward the axis of the tube as at 20 as it spans the valleys 16. The undulations 20 correspond with the location of the slotted openings 18.

The corrugated tube 12 is preferably fabricated of a durable, high strength polyethylene although other materials are suitable. Extruding techniques are used to shape the tubing by forcing the molten plastic through an annular orifice, as is well known. The formed plastic tube is then reshaped to form corrugations 14, 16 and transverse slotted openings 18.

The improved sleeve 10 described hereinabove covers those slotted openings and actually provides a filter so that gravel, rock, mud, dirt and the like cannot clog the openings 18 which would result in a less efficient drainage, or if the condition became bad enough, no drainage at all. The sleeve may be factory installed with assurance that transportation, assembly and installation in the field will not damage or dislodge the sleeve. The improvements to the sleeve make it more permanent and easier to install, as well as being more durable during transportation and storage.

Although a preferred embodiment of the invention has been shown and described, it is apparent that changes and modifications could be made without departing from the scope and spirit of the invention which is set forth in the following claims.

I claim:

1. In the subsurface drainage of water from land wherein corrugated drainage pipe having alternating peaks and valleys and a plurality of openings in selected valleys arranged along the longitudinal axis of the pipe is buried beneath the surface of the ground, the method of preventing the pipe and its openings in selected valleys from becoming clogged with gravel, rock, mud, dirt and the like which comprises providing a length of pipe of the type described having a desired maximum diameter, providing a length of tubular knit fabric corresponding in length with the length of said pipe and having a maximum diameter in the relaxed condition less than said desired maximum diameter of the pipe, installing said tubular knit fabric on said pipe, and permitting the tubular knit fabric to relax into snug, tight engagement with the peaks of the pipe with intervening undulations of the tubular knit fabric extending inwardly toward the axis of the pipe in correspondence with the location of said openings as the tubular knit fabric spans the valleys of the pipe.

2. A method according to claim 1 wherein the tubular knit fabric is of non-run construction.

* * * * *